United States Patent [19]

Guillaumon et al.

[11] 4,317,855

[45] Mar. 2, 1982

[54] ELECTRICALLY CONDUCTIVE WHITE COATINGS

[75] Inventors: Jean-Claude Guillaumon, Ayguesvives; Louis J. C. Blet, Ramonville St. Agne, both of France

[73] Assignee: Centre National d'Etudes Spatiales, Paris, France

[21] Appl. No.: 151,564

[22] Filed: May 20, 1980

[30] Foreign Application Priority Data

May 30, 1979 [FR] France .................. 79 13812

[51] Int. Cl.$^3$ .................. B32B 7/02; B32B 15/02; B32B 15/04
[52] U.S. Cl. .................. 428/212; 428/415; 428/432; 428/469; 428/425.6; 428/425.8; 428/429; 428/450; 428/472; 428/701; 428/703; 428/328
[58] Field of Search .............. 428/469, 432, 328, 415, 428/425.6, 425.8, 429, 450, 472, 701, 703, 212

[56] References Cited

U.S. PATENT DOCUMENTS 4,163,075 7/1979 Nakano .................. 428/469
4,167,602 9/1979 Serlin .................. 428/328

*Primary Examiner*—Ellis P. Robinson
*Attorney, Agent, or Firm*—Neil F. Markva

[57] ABSTRACT

This invention relates to an electrically conductive white coating of the paint type, which has a solar absorption $\alpha_S$ not greater than 0.30, a hemispherical emission factor $\epsilon$ not less than 0.80, a surface resistance $R_S$, measured in a vacuum less than $10^{-5}$ torr, not greater than $10^9$ ohms/square, and which meets the degasification-pollution requirements, characterized in that the coating comprises (a) a layer which is a good conductor of electricity and (b) a white layer which is a poor conductor of electricity and which is applied on top of layer (a). The coating is for use in the space and aeronautical industries.

15 Claims, No Drawings

ELECTRICALLY CONDUCTIVE WHITE COATINGS

BACKGROUND OF THE INVENTION

This invention relates to white coatings, of the paint type, which are conductors of electricity.

In space engineering there is a need for coatings which are conductors of electricity and which have the following properties:

$\alpha_s$ (solar absorption) $\leq 0.30$ $\epsilon$ (hemispherical emission factor) $\geq 0.80$ Surface resistance $R_S$ (measured in a vacuum less than $10^{-5}$ torr) $\leq 10^9$ ohms/square and which, in addition, meet the degasification-pollution requirements. That is, the requirements are that a sample of the coating submitted to a temperature of 125° C. in a vacuum less than $10^{-5}$ torr for 24 hours should not undergo a weight loss greater than 1% and that the condensable products collected on a disc maintained at a temperature of 25° C. should not be greater than 0.1%.

Such coatings are required for the thermal control of certain satellites, in particular geostationary satellites, and also for avoiding the accumulation of electric charges on these satellites due to irradiation by electrons or protons. White paints which are already known for applications in space do not have all these properties since they are electrically insulating ($R_S$ of the order of $10^{12}$ ohms/square).

The only known coatings which comply with all these properties, but which are not paints, can be classified within the following three types:

fabrics of quartz with or without a coating which is a conductor of electricity (doped indium oxide);

substrates of plastics material metallized on their inner surface and coated with a thin layer of doped indium oxide or tin oxide on their outer surface, these substrates being referred to as SSM (second surface mirror);

glass substrates (for example containing cerium) coated with a layer of doped indium oxide or tin oxide, these substrates being referred to as OSR (optical surface reflector).

The main disadvantage of these coatings is that they are very costly, as involving a very complicated technology.

It would therefore be advantageous to have electrically conductive white coatings of the paint type, which are easy to produce and inexpensive.

SUMMARY OF THE INVENTION

This invention relates to an electrically conductive white coating, of the paint type, which has a solar absorption $\alpha_s$ not greater than 0.30, a hemispherical emission factor not less than 0.80, a surface resistance $R_S$, measured in a vacuum less than $10^{-5}$ torr, not greater than $10^9$ ohms/square, and which meets the degasification-pollution requirements. The coating comprises (a) a layer which is a good conductor of electricity, and (b) a white layer which is a poor conductor of electricity and which is applied on top of layer (a).

If desired, the coating can comprise more than a pair of layers (a) and (b). For example, the coating can comprise a first layer (a), a first layer (b), a second layer (a) and a second layer (b) applied in succession one on top of the other.

Also, optionally, the coating according to the invention can comprise, in addition, a primary anchoring layer applied directly on to the substrate prior to the application of layers (a) and (b), and/or a layer of white paint which is substantially non-conductive to electricity, and which is applied either directly to the substrate or to the primary layer, if any.

Advantageously the layer (a) which is a good conductor of electricity has an $R_S$ less than 1 ohm/square. Advantageously, the layer (b), which is a poor conductor of electricity, has an $R_S$ greater than $10^5$ ohms/square.

DETAILED DESCRIPTION

Layer (a) can have various compositions; it can comprise, for example:

an inorganic or organic binding agent and a metal in the form of a powder or flakes;

an inorganic or organic binding agent and a mixture of metallic powder or flakes and of a white pigment which is a poor conductor of electricity;

a metallic powder or metallic flakes dispersed in a suitable medium;

a mixture of metallic powder or metallic flakes and of a white pigment which is a semi-conductor of electricity, dispersed in a suitable medium.

The thickness of layer (a) is preferably at least approximately 15 microns.

Layer (b) can also have various compositions; it can comprise, for example:

an inorganic or organic binding agent and a white pigment which is a semi-conductor;

an inorganic or organic binding agent and a mixture of a white pigment which is a semi-conductor and of a white pigment which is substantially non-conductive to electricity;

a white pigment which is a semi-conductor, dispersed in a suitable medium;

a mixture of a white pigment which is a semi-conductor and of a white pigment which is substantially non-conductive to electricity, dispersed in a suitable medium.

The thickness of layer (b) preferably does not exceed approximately 100 microns.

The following are examples of metallic powders or flakes which can be used: powders or flakes of silver, zinc, copper, aluminum, platinum, palladium, magnesium, etc.

The following are examples of organic binding agents which can be used: silicones, epoxy resins, polyurethanes, acrylic resins, glycerol-phtalic resins, etc. Up till now it has been preferable to use silicones for applications in space and polyurethanes for aeronautical applications. Examples of inorganic binding agents which can be used are silicates, such as silicates of potassium, sodium, calcium, etc.

Examples of white pigments which are semi-conductors and which can be used are oxygen-deprived non-doped tin oxide or doped tin oxide (with chlorine, fluorine, antimony, indium, bismuth, etc.), and oxygen-deprived non-doped indium oxide or doped indium oxide (with tin, antimony, bismuth, titanium, lead, etc.). These pigments, which are semi-conductors, are well known and are available commercially from various manufacturers (for example Merck Co.).

Examples of white pigments which are substantially non-conductive to electricity and which can be used are zinc oxide, barium sulphate, zinc orthotitanate, titanium dioxide, etc.

The mixture of metallic powder or flakes and of white semi-conducting pigment can contain 50 to 99% metallic powder or flakes by weight and 50 to 1% white semi-conducting pigment by weight.

The mixture of white semi-conducting pigment and of white substantially non-conductive pigment can contain 50 to 99% semi-conducting pigment by weight and 50 to 1% substantially non-conductive pigment by weight.

The various layers of the coating according to the invention can be applied to a substrate with a spray-gun, a brush or any other known means. The coating according to the invention can be applied to all types of substrates such as glass and metal. If a composition without binding agent is used for layer (a), it is preferable to apply this composition without binding agent on to a base layer of white paint which is still not completely dry, so as to obtain a better adherence of the metallic powder or flakes. In the same way, if a composition without binding agent is used for layer (b), it is preferable, but not obligatory, to apply this composition on to a layer (a) which comprises a binding agent and which is still not completely dry. Likewise, if compositions without binding agent are used for layers (a) and (b), it is preferable to apply these compositions one after another on to a base layer of white paint which is still not completely dry.

Apart from its use on space satellites, the coating according to the invention can be used in the aeronautical industry where it can be applied on airplanes so as to avoid the accumulation of static electricity on the parts of airplanes which are substantially non-conductive to electricity.

The non-limiting examples below are given in order to illustrate the invention.

EXAMPLE 1

An electrically conductive white coating is obtained by applying the following successive or contiguous layers to a substrate of glass which is substantially non-conductive to electricity. The thicknesses indicated are the thicknesses of the layers after they have dried:

(1) a 10 micron thick layer of a primary anchoring composition based on epoxy resin and strontium chromate, sold under the commercial designation P 128 by the French ASTRAL company;

(2) a 100 micron thick layer of a white paint which is substantially non-conductive to electricity (based on ZnO and silicone resin RTV 121 produced by RHONE-POULENC), sold under the commercial designation PSG 120 by the French ASTRAL company;

(3) a 30 micron thick layer obtained from a dispersion of 50 g of silver flakes in 50 g of methylethylketone (size of flakes: 50 to 100 microns);

(4) a 60 micron thick layer obtained from a dispersion of 20 g of white pigment made of tin oxide doped with fluorine in 50 g of methylethylketone.

The properties of the coating obtained are as follows:
$\alpha_S = 0.25$
$\epsilon = 0.85$
$R_S = 5$ ohms/square

EXAMPLE 2

An electrically conductive white coating is obtained by applying the following successive or contiguous layers to a substrate of glass which is substantially non-conductive to electricity, the thicknesses indicated being the thicknesses of the layers after they have dried:

(1) a 10 micron thick layer of a primary anchoring composition sold under the commercial designation P 128 by the French ASTRAL company;

(2) a 100 micron thick layer of a white paint which is substantially non-conductive to electricity sold under the commercial designation PSG 120 by the French ASTRAL company;

(3) a 30 micron thick layer obtained from a dispersion comprising 15 g of silver flakes having a size from 50 to 100 microns, 10 g of silicone resin RTV 121 (RHONE-POULENC) used as a binding agent, and 20 cm$^3$ of toluene;

(4) a 60 micron thick layer obtained from a dispersion comprising 20 g of powdered tin oxide doped with fluorine, 10 g of silicone resin RTV 121 and 20 cm$^3$ of toluene.

The properties of the coating obtained are as follows:
$\alpha_S = 0.30$
$\epsilon = 0.81$
$R_S = 20$ ohms/square

EXAMPLE 3

An electrically conductive white coating is obtained by applying the following successive or contiguous layers to a substrate of glass which is substantially non-conductive to electricity, the thicknesses indicated being the thicknesses of the layers after they have dried:

(1) a 10 micron thick layer of a primary anchoring composition sold under the commercial designation P 128 by the French ASTRAL company;

(2) a 30 micron thick conductive layer obtained from a composition comprising 12 g of silicone resin RTV 121, 15 g of silver flakes, 10 g of tin oxide doped with fluorine, and 30 cm$^3$ of toluene;

(3) a 60 micron thick layer which is a poor conductor of electricity, obtained from a composition comprising 15 g of silicone resin RTV 121, 20 g of tin oxide doped with fluorine, 10 g of zinc oxide, and 30 cm$^3$ of toluene.

The properties of the coating are as follows:
$\alpha_S = 0.30$
$\epsilon = 0.85$
$R_S 200$ ohms/square

EXAMPLE 4

An electrically conductive white coating is obtained by applying the following successive or contiguous layers to a metal substrate (aluminum alloy AU 4 G), the thicknesses indicated being the thicknesses of the layers after they have dried:

(1) a 10 micron thick layer of the primary anchoring composition P 128 sold by ASTRAL;

(2) a conducting layer identical to layer (2) in Example 3;

(3) a 60 micron thick white layer, which is a poor conductor of electricity, obtained from a composition comprising 10 g of silicone resin RTV 121, 25 g of tin oxide doped with fluorine, and 30 cm$^3$ of toluene.

$\alpha_S = 0.30$
$\epsilon = 0.83$
$R_S = 4 \times 10^6$ ohms/square.

EXAMPLE 5

An electrically conductive white coating is obtained by applying the following successive or contiguous layers to a metal substrate (aluminum alloy A G 5), the thicknesses indicated being the thicknesses of the layers after they have dried:

(1) a 10 micron thick layer of the primary anchoring composition P 128 sold by ASTRAL;

(2) a conducting layer identical to layer (2) in Example 3;

(3) a 60 micron thick white layer, which is a poor conductor of electricity, obtained from a composition comprising 15g of RTV 121, 21 g of tin oxide doped with fluorine, 14 g of zinc oxide, and 30 cm$^3$ of toluene.

The properties of the coating are as follows:
$\alpha_S = 0.24$
$\epsilon = 0.85$
$R_S = 2 \times 10^7$ ohms/square.

We claim:

1. An electrically conductive white coating of the paint type disposed on a substrate, said white coating comprising:
   (a) a first layer having a surface resistance lower than 1 ohm/square,
   (b) a white layer disposed contiguously to the first layer and having a surface resistance higher than $10^5$ ohms/square,
   (c) said coating having a solar absorption $\alpha_s$ not greater than 0.30, a hemispherical emission factor $\epsilon$ not less than 0.80, and a surface resistance $R_s$ measured in a vacuum lower than $10^{-5}$ torr, not greater than $10^9$ ohms/square.

2. A white coating as defined in claim 1 wherein the first layer includes a metallic particulate material.

3. A white coating as defined in claim 1 wherein said white layer includes an electrically semi-conductive white pigment.

4. A white coating as defined in claim 1 wherein said coating has a structural configuration which meets the gasification-pollution requirements.

5. A coating as defined in claim 1 wherein there is a plurality of white coatings each including said first and white layers.

6. A coating as defined in claim 1 wherein a primary anchoring layer is applied to said substrate and the white coating is contiguously disposed on said primary anchoring layer.

7. A coating as defined in claim 1 wherein a layer of white paint which is substantially electrically nonconductive is applied to the substrate underneath said white coating.

8. A coating as defined in claim 1 wherein a primary anchoring layer is applied to the substrate, a layer of white paint which is substantially electrically nonconductive is applied over said primary anchoring layer and said white coating is disposed on said layer of white paint.

9. A coating as defined in claim 1 wherein said first layer has a composition selected from the group consisting of (1) an inorganic or organic binding agent and a particulate metal material, (2) an inorganic or organic binding agent and a mixture of a particulate metal material with a white pigment having a low electrical conductivity, (3) particulate metallic material disbursed in a suitable medium, and (4) a mixture of a particulate metal material and white pigment which is electrically semiconductive, said mixture being disbursed in a suitable medium.

10. A coating as defined in claim 1 wherein the white layer has a composition selected from the group consisting of (1) an inorganic or organic binding agent and a white pigment being electrically semiconductive, (2) an inorganic or organic binding agent and a mixture of a semiconductive white pigment and a substantially electrically nonconductive white pigment, (3) an electrically semiconductive white pigment disbursed in a suitable medium, (4) a mixture of an electrically semiconductive white pigment and a substantially electrically nonconductive white pigment, said mixture being disbursed in a suitable medium.

11. A coating as defined in claim 1 wherein said first layer comprises particulate metal materials selected from the group consisting of silver, zinc, copper, aluminum, platinum, palladium and magnesium.

12. A coating as defined in claim 1 wherein the white layer includes a substantially electrically nonconductive white pigment.

13. A coating as defined in claim 1 wherein said white layer includes a semiconductive white pigment selected from the group consisting of doped tin oxide, oxygen-deprived, non-doped tin oxide, doped indium oxide and oxygen-deprived, non-doped indium oxide.

14. A coating as defined in claim 1 wherein said first layer has a thickness of at least 15 microns.

15. A coating as defined in claim 1 wherein said white layer has a thickness which does not exceed 100 microns.

* * * * *